(12) United States Patent
Firoiu et al.

(10) Patent No.: US 8,107,914 B2
(45) Date of Patent: Jan. 31, 2012

(54) RF FILTER WITH LOW-IF MIXING, TUNING AND CALIBRATION

(76) Inventors: Daniel Firoiu, San Diego, CA (US);
Damian Costa, San Diego, CA (US);
Mats Lindstrom, San Diego, CA (US);
Kendal McNaught-Davis Hess, San Diego, CA (US); Weinen Gao, San Diego, CA (US)

( * ) Notice: Subject to any disclaimer, the term of this patent is extended or adjusted under 35 U.S.C. 154(b) by 665 days.

(21) Appl. No.: 12/335,905

(22) Filed: Dec. 16, 2008

(65) Prior Publication Data
US 2010/0151806 A1 Jun. 17, 2010

(51) Int. Cl.
*H04B 1/06* (2006.01)
*H04B 7/00* (2006.01)
*H04B 1/16* (2006.01)
*H04B 1/10* (2006.01)
*H04B 1/18* (2006.01)
*H04B 1/68* (2006.01)
*H04B 1/26* (2006.01)

(52) U.S. Cl. ........ 455/266; 455/340; 455/213; 455/307; 455/189.1; 455/46; 455/319

(58) Field of Classification Search .................. 455/3.05, 455/266, 340, 213, 307, 189.1, 46, 319
See application file for complete search history.

(56) References Cited

U.S. PATENT DOCUMENTS

| | | | |
|---|---|---|---|
| 6,766,150 B1 * | 7/2004 | Johnson | 455/87 |
| 7,127,217 B2 | 10/2006 | Tuttle et al. | |
| 7,761,067 B1 * | 7/2010 | Tsai et al. | 455/127.2 |
| 2003/0008628 A1 * | 1/2003 | Lindell et al. | 455/180.1 |
| 2006/0001559 A1 * | 1/2006 | Tuttle et al. | 341/120 |
| 2006/0160518 A1 * | 7/2006 | Seendripu et al. | 455/323 |
| 2007/0042734 A1 * | 2/2007 | Ryu et al. | 455/182.3 |
| 2008/0057897 A1 * | 3/2008 | Magnusen et al. | 455/196.1 |
| 2008/0132189 A1 * | 6/2008 | Maxim et al. | 455/280 |
| 2009/0325521 A1 * | 12/2009 | Dubash et al. | 455/150.1 |
| 2010/0085490 A1 * | 4/2010 | Chen | 348/725 |

* cited by examiner

*Primary Examiner* — Temesgh Ghebretinsae
*Assistant Examiner* — Devan Sandiford (57) ABSTRACT

Radio-frequency (RF) circuits, methods and systems are implemented according to a variety of embodiments. According to one such embodiment, a radio-frequency (RF) receiver circuit is implemented with an adjustable RF filter circuit in a receive path of the RF receiver circuit. A local oscillator (LO) generates a LO signal and an RX_LO signal from the LO signal. A mixing circuit mixes a signal received from the adjustable RF filter circuit and the RX_LO signal. An intermediate-frequency (IF) circuit generates an IF_cal signal at the receiver circuit. A calibration circuit implements both a calibration mode and a receive mode. In the calibration mode, a calibration signal is injected into the receive path. A setting of the adjustable RF filter circuit is determined. In the receive mode, the calibration circuit disables the injection of the calibration signal into the receive path of the RF receiver circuit.

20 Claims, 9 Drawing Sheets

RF FILTER WITH LOW-IF MIXING, TUNING AND CALIBRATION

FIELD OF INVENTION

This patent document relates to circuits, systems and methods for use with mixing, tuning and calibration relating to radio-frequency (RF) filters, and more specific implementations can be used with Low intermediate frequency (IF) and/or Zero IF, broadband tuners, such as those used for Digital Video Broadcasting (DVB).

BACKGROUND

Digital Video Broadcasting (DVB) is a set of standards used for digital television broadcasting. The DVB standards include a number of different subsets. Satellite broadcasts can use variations of DVB-S, cable broadcasts can use DVB-C; terrestrial television can use variations of DVB-T, and digital terrestrial television for handhelds can use DVB-H or DVB-SH.

Current DVB-S broadband tuners are designed for receiving a relatively weak RF signal in the presence of multiple other signals including other channels or out of band interference. Many broadband DVB-S tuners receive channels between 950 MHz to 2150 MHz, down-converted from 12 GHz to 14 GHz by a low-noise block (LNB). Some systems have multiple antennas pointing to different satellites. This can result in the receiver needing to detect the desired signal in the presence of multiple channels and at a much lower level. Different cable lengths from LNB to indoor tuner and multiple down-converters further contribute to level imbalance between different received channels. As a result, the difference between a desired channel and an unwanted channel can be as high as 40 dB. Thus, a tuner should have a very good selectivity. Selectivity can be increased by filtering the undesired channel before reaching the demodulator.

Receivers with zero-IF and low IF have been developed to perform most of the filtering at low frequency rather than at RF. The RF stages, mixer and post mixer filters can have linearity constraints that can become problematic when multiple carriers with strong levels are present. Thus, filtering the signal in the RF front can be advantageous or even necessary. While it is possible to filter the unwanted signal before reaching the input of the tuner low-noise amplifier (LNA) this topology involves a series of passive external components that will take space, degrade noise figure and may not provide constant input impedance over frequency.

Aspects of the present invention allow for an integrated filter placed after the internal LNA capable of achieving front end selectivity, high linearity and sensitivity in the presence of unwanted strong signals. Other aspects of the present invention provide a reliable calibration architecture and method that increases performance for the filter.

SUMMARY

The present invention is directed to overcoming the above-mentioned challenges and others related to the types of applications discussed above and in other applications. These and other aspects of the present invention are exemplified in a number of illustrated implementations and applications, some of which are shown in the figures and characterized in the claims section that follows.

According to an example embodiment of the present invention, a radio-frequency (RF) receiver circuit is implemented. The circuit includes an adjustable RF filter circuit in a receive path of the RF receiver circuit. A local oscillator (LO) generates a LO signal and an RX_LO signal from the LO signal. A mixing circuit mixes a signal received from the adjustable RF filter circuit and the RX_LO signal. A circuit generates an IF_cal signal at the receiver circuit. A calibration circuit implements a calibration mode and a receive mode. In the calibration mode, the calibration circuit generates a calibration signal from the LO signal, injects the calibration signal into the receive path of the RF receiver circuit and before the adjustable RF filter, enables the use of the IF_cal signal in calibrating the receiver circuit; and responsive to the injected calibration signal and an output of the mixing circuit, assesses a setting of the adjustable RF filter circuit using a feedback signal. In the receive mode, the calibration circuit disables the injection of the calibration signal into the receive path of the RF receiver circuit.

According to another embodiment of the present invention, a radio-frequency (RF) circuit implemented method is provided. The method uses an intermediate frequency signal during receiving of RF signals. A local oscillator (LO) signal and a RX_LO signal from the LO signal are each generated. An injection signal is injected into a receive path of the RF circuit. The injection signal is derived from a local oscillator (LO) signal and an IF_cal signal. The IF_cal signal has a frequency that is about equal to the intermediate frequency signal. The injected signal is filtered by an adjustable RF filter circuit, to produce a filtered signal. The filtered signal is mixed with the RX_LO signal to produce an IF signal. A filter setting is selected for the adjustable filter circuit in response to the IF signal.

According to another embodiment, a receiver is implemented to allow for calibration of an RF filter circuit. The RF filter circuit includes a capacitive array configured and arranged to provide an adjustable capacitive value(s) for the RF filter circuit and thereby generating a filtered signal. The receiver uses a local oscillator (LO) circuit configured and arranged to generate a LO signal and an RX_LO signal from the LO signal. A calibration-signal-generation circuit is configured and arranged to add an intermediate frequency calibration (IF_cal) signal to the LO signal in response to an IF control signal (enable). A mixing circuit is configured and arranged to mix the RX_LO signal with the filtered signal to generate a mixed signal. A calibration control circuit is configured and arranged to determine, using the mixed signal from the mixing circuit, the effectiveness of a capacitive value of the filter circuit; generate the IF control signal (enable); and provide a signal for adjusting the capacitive value of the capacitive array.

The above summary is not intended to describe each illustrated embodiment or every implementation of the present invention.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention, including that defined by the claims.

DETAILED DESCRIPTION

The present invention is applicable to a variety of applications, such as zero/low-intermediate frequency (IF) mixing, tuning and calibration circuits, methods and systems, including those applications such as high-linearity and low-noise satellite tuners. While the present invention is not necessarily limited to such applications, an appreciation of various aspects of the invention is gained through a discussion of examples in such an environment. Moreover, while aspects of the present invention may be conveniently illustrated in the context of a Digital Video Broadcasting (DVB) tuner/receiver, it will be appreciated that embodiments of the present invention are also applicable to other receivers, as indicated in the descriptions that follow.

According to one embodiment of the present invention, a tuner/receiver circuit is implemented with calibration circuitry. The receiver circuit includes an adjustable portion(s) of the receive path, such as an adjustable RF filter circuit. A local oscillator (LO) circuit generates a LO signal. The LO signal can be used by the receiver path mixers and by the calibration signal generation circuit to generate the signals used for both a normal receiving mode and for a calibration mode. When the LO signal is applied to the receiver path mixers it is referred to as RX_LO, and is mixed with a received signal resulting in a low frequency IF signal. In a specific implementation, one version of the LO signal is rotated 90 degrees in phase to allow for complex down-conversion of the received signal into I and Q signal components. During a calibration mode a calibration signal (RF_cal) is derived from the LO signal, or modification thereof. The calibration signal is injected into the front-end of the receiver (e.g., after the LNA) and before RF adjustable filter so that the calibration signal is processed similar to a received radio-frequency (RF) signal. The frequency of the calibration signal can be selected based upon the channel for which the receiver is being calibrated. The calibration signal is processed by the receiver, which includes mixing with the RX_LO signal, and the signal strength is evaluated for various settings of the adjustable portion. The process can be repeated as necessary (e.g., for multiple channels) to select a suitable setting(s) for the adjustable filter.

In one embodiment of the present invention, the receiver can add a frequency-based component to the LO signal to generate the calibration signal. For example, a relatively low frequency signal (IF_cal) can be mixed with one component of the LO signal to generate the calibration signal. The IF_cal signal can be selected based upon (e.g., equal with or about equal to) the receiver IF frequency. The frequency of the IF_cal signal can be chosen in such a way that the down-converted signal in the receiver mixer is within the pass band of the IF Block filters. The calibration mixer can be designed for Double-Side Band generation. This can be particularly useful for simplifying the mixer and circuits that generates LO and IF_cal signals. If the sidebands at $+/-f_{IF\_cal}$ are close in frequency, the calibration signal can be approximated with a narrow band signal. When down-converted by the receiver mixer these sidebands will flip one on top of each other due to their equal spacing ($f_{IF\_cal}$) from the center of the receiver local oscillator signal RX_LO.

In one implementation, a positive offset, followed by a negative frequency offset (the offsets being relative to the center of the channel), are introduced into the calibration signal. The signal strength is evaluated for these calibration signals. These calibration steps can be useful in centering the filter characteristic and/or in determining errors (e.g., process errors) in the filter components.

Figure 1A:
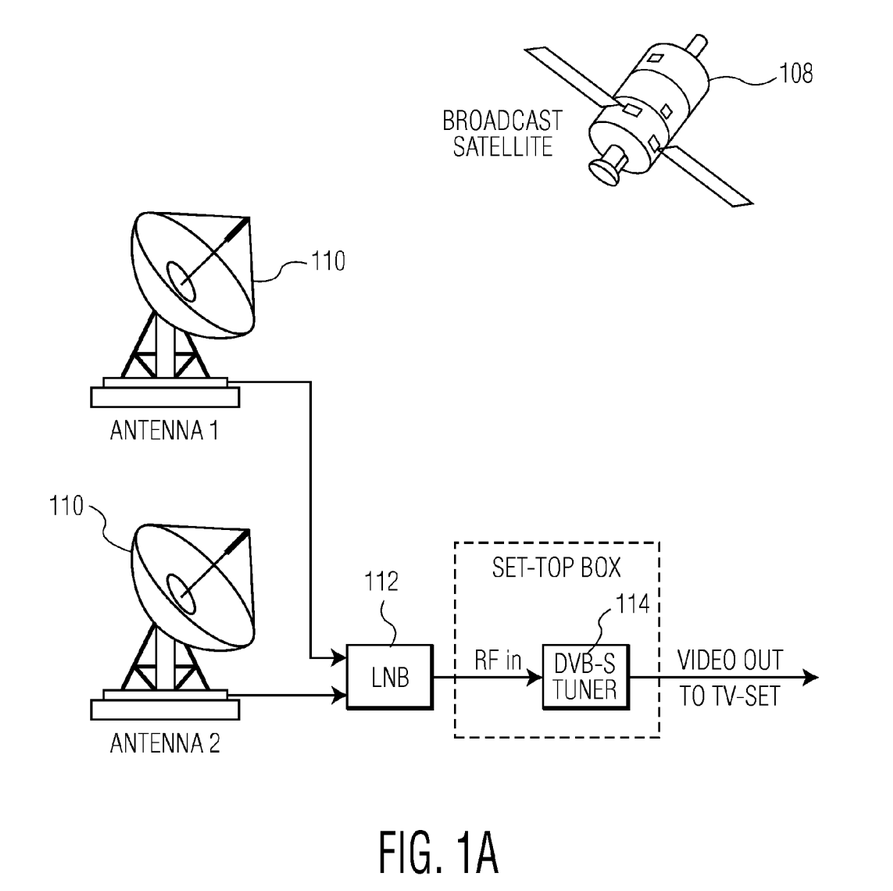
FIG. 1A shows implementations of a receiver, according to an embodiment of the present invention.

Turning now to the figures, FIG. 1A shows implementations of a receiver according embodiments of the present invention. Communication satellites 108 broadcast RF signals, such as a digital television (TV) signal. For example, the broadcast can be sent on channels between 12 GHz to 14 GHz. Antennas 110 receive the broadcast signal. The received signal is down-converted from 12 GHz to 14 GHz by a low-noise block (LNB) 112. Tuner 114 then filters, amplifies and/or demodulates the signal according to a selected channel. The output of tuner 114 can then be used by a TV or similar display device. This digital TV implementation is merely an example of a specific implementation and embodiments of the present invention are not limited to tuners/receivers of such an implementation. Indeed numerous other implementations of RF transmissions can be equally used in connection with one or more embodiments of the present invention.

Figure 1B:
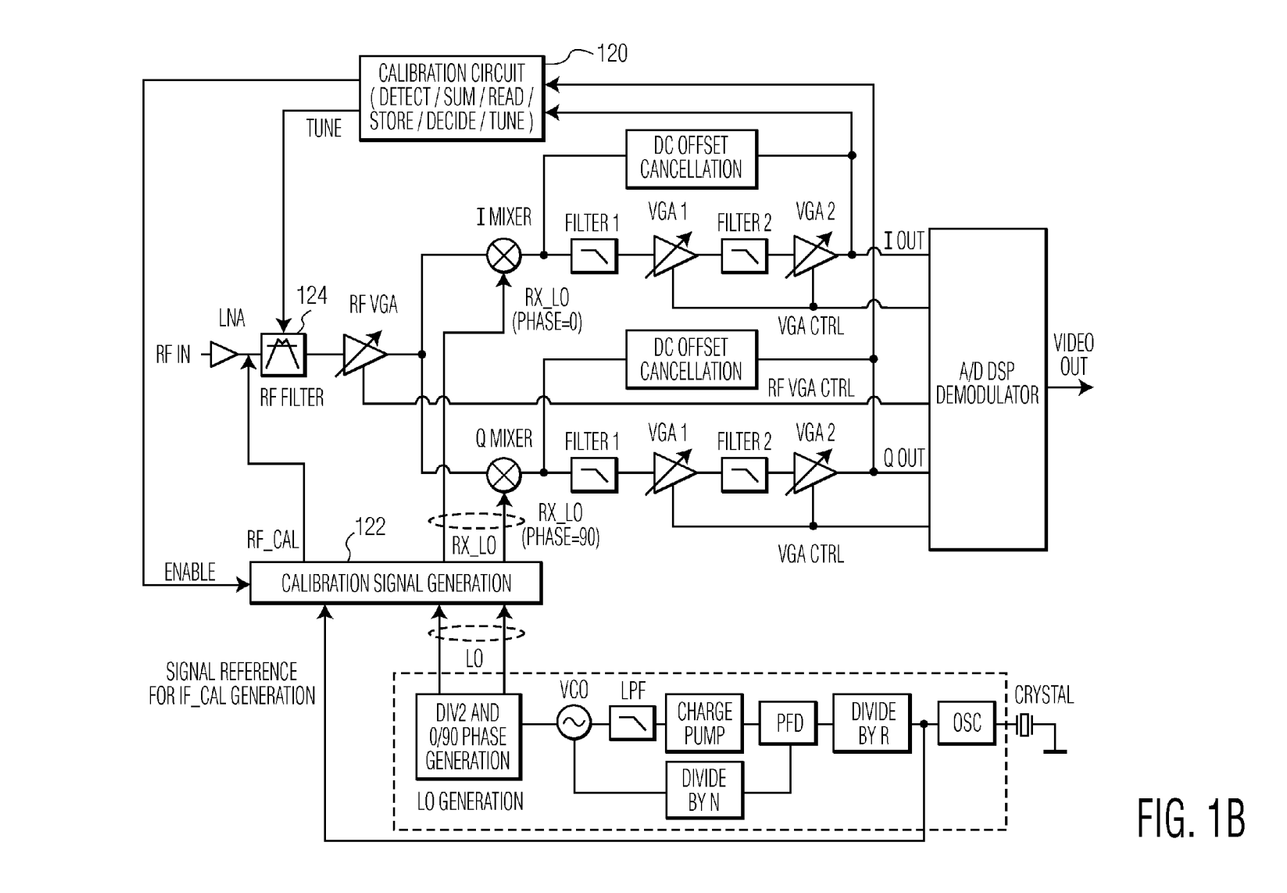
FIG. 1B shows an example implementation of the tuner 114 of FIG. 1A, according an embodiment of the present invention.

FIG. 1B shows an example implementation of the tuner 114 of FIG. 1A. During normal operation an RF signal is received at RF in. An LNA amplifies the signal and adjustable filter circuit 124 filters unwanted signals while allowing the desired RF signal to pass. An RF variable gain amplifier (RF VGA), operating at the RF frequency, amplifies the filtered signal. The signal from the RF VGA is sent to a mixer to down-convert the calibration injected signal to low frequency or DC. At this point, I and Q signal paths are created. Each path mixes a version of the RX_LO signal that is 90 degrees out of phase from the version of the RX_LO signal of the other path. This results in I and Q down-converted versions of the RF signal. A sequence of low frequency filters and gain blocks are controlled by automatic-gain-control (AGC). Together these filters and AGC control the filter gain and amplify the resulted signal to a predetermined level that assures enough accuracy when measured and evaluated.

Additional filter/gain stages can be implemented as desired before the signal is passed to the demodulation section of the receiver.

In a specific implementation, the receiver/tuner includes a DC offset cancellation block. The output of the tuner is fed to an analog to digital converter and a demodulator that decodes the signal and generates the original data, such as a digital TV signal. A microprocessor (not shown) and software stored in the system memory controls the tuner and demodulator. In addition to receiving and demodulating a (TV digital) signal, most of these blocks can be used for tuning and calibration of the filter prior to receiving a channel in a normal operation.

During calibration mode, calibration circuit 120 enables Calibration Signal Generation circuit 122, thereby allowing a calibration signal to be injected into the receive path of the receiver/tuner. The calibration signal is derived from the same LO signal that is used to down-convert the signal later in the receive path. In one implementation, the LO (equal with RX_LO frequency, $f_{LO}=f_{RX\_LO}$) signal can be directly injected into the RF Filter. In some instances of this implementation a low frequency signal (IF_cal) to be used to generate the RX_LO signal (not equal with, but derived from, the LO signal) during calibration. Other implementations allow for a low frequency signal (IF_cal) to be mixed with the LO signal thus generating a RF calibration signal with one or more components at an offset from LO.

Calibration circuit 120 detects the strength of calibration signal after passing through the receive path. Calibration circuit 120 can adjust the settings of variable filter circuit 124. The resulting signal strength can be compared between different filter settings. Further details on example methods and filter setting selections are discussed herein.

In some instances, the RF filter circuit introduces a phase-shift component into the calibration signal. If only one (I or Q) path were used to determine the signal strength, calibration circuit 120 would require accounting for phase of the signal component. In a particular embodiment, however, calibration circuit 120 detects the strength of the calibration signal using both I and Q signal components, thereby taking advantage of the 90 degree phase relationship between the signal components. For instance, the I and Q signal components can each be squared and then added to one another. The square-root of this addition can then be taken. The resulting value can be used as the signal strength of the calibration signal for the calculation of the desired filter setting(s). Thus, the signal strength can be determined using the following equation: $\sqrt{I^2+Q^2}$. This can be particularly useful for removing the phase dependency from the signal strength determination.

Using the same LO signal (or a component thereof) can be particularly useful for implementing the calibration circuit on a single integrated circuit (IC) die and for simultaneously tuning of the filter to the desired frequency and calibration of the frequency response by adjusting the filter components. Thus, the passive and active integrated components over process, voltage and temperature can be compensated for to preserve the expected transfer function of the filter.

Figure 2:
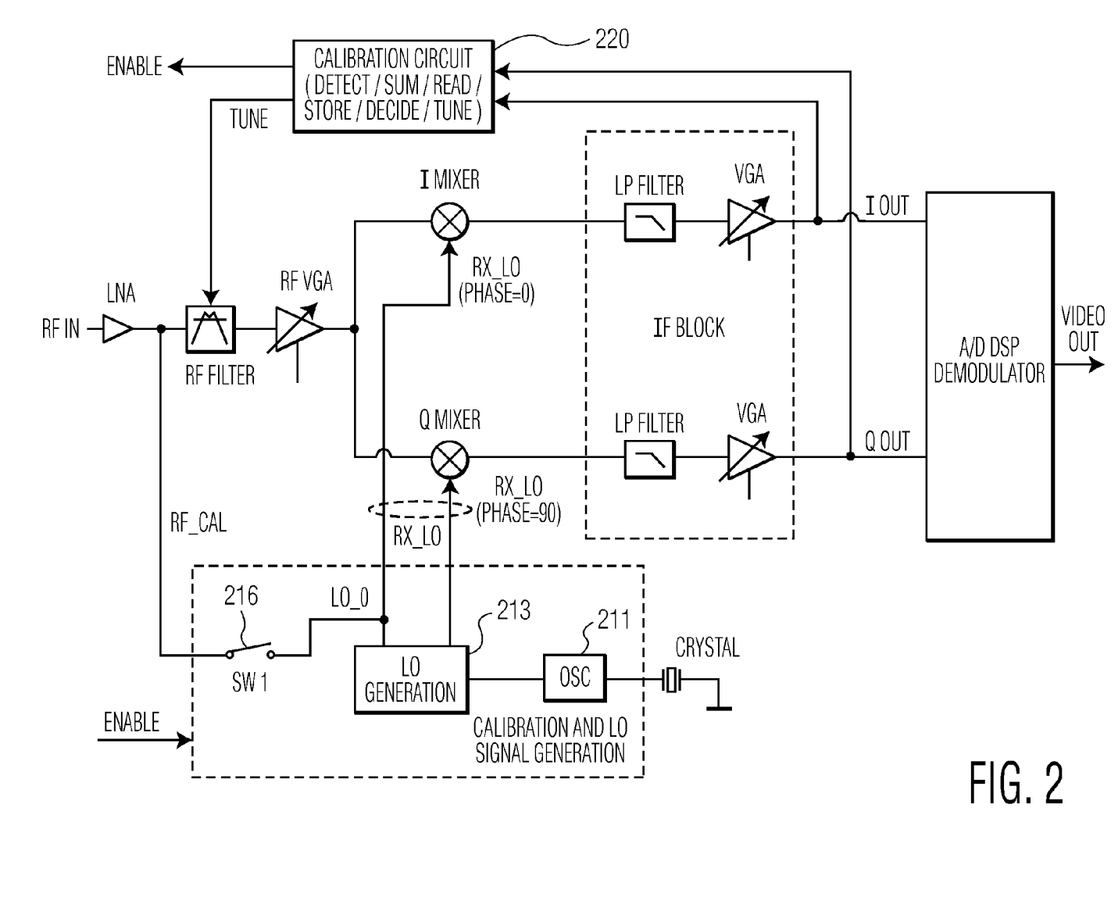
FIG. 2 depicts an example implementation of a receiver/tuner circuit for zero IF mixing, according to an example embodiment of the present invention.

FIG. 2 depicts an example implementation of a receiver/tuner circuit implemented according to an example embodiment of the present invention. The RF calibration signal (RF_Cal) is derived from the local oscillator (LO) and has the same frequency as LO ($f_{RF\_cal}=f_{LO}$). After filtering by the RF Filter and amplification by the RF VGA the RF calibration signal is down-converted to DC by the I and Q mixers of the tuner.

Figure 3:
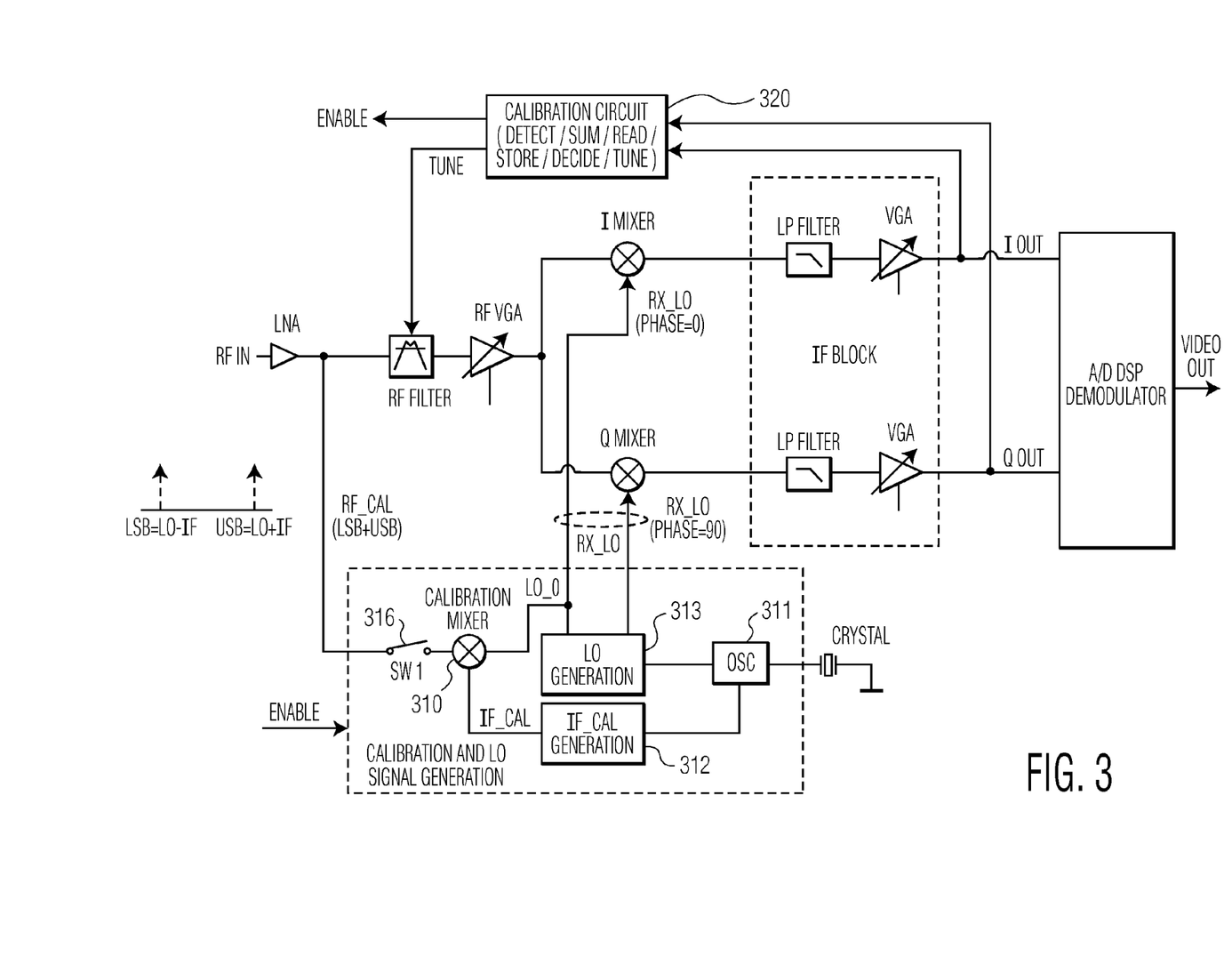
FIG. 3 depicts an example implementation of a receiver/tuner circuit for low IF, according to an example embodiment of the present invention.

FIG. 3 depicts an example implementation of a receiver/tuner circuit implemented according to an example embodiment of the present invention. A component of the LO signal (LO_0) with phase equal zero degrees can be mixed in the calibration mixer 310. Mixer 310 can generate a double side band signal (DSB) where the lower side band (LSB) has a frequency $f_{RF\_cal\_LSB}=f_{LO}-f_{IF\_cal}$ and the upper side band (USB) $f_{RF\_cal\_USB}=f_{LO}+f_{IF\_cal}$.

Mixer 310 can introduce offset signals equal to the ±IF frequency of the receiver or different IF frequencies. In one implementation the offset signal IF_cal can be derived from the Phase Lock Loop reference oscillator 311 using a divider and a low pass filter. Other methods of signal generation like RC oscillators can be used. After passing the RF filter, the calibration signal is further amplified and applied to the tuner mixer. The down-converted signal frequency is expected to be equal with $f_{IF\_cal}$ due to the use of the same LO signal in the down conversion. One IF component of the down-converted signal is derived from the USB of the RF_Cal signal $$f_{RF_{cal}\_USB}-f_{RX\_LO}=(f_{LO}+f_{IF\_cal})-f_{RX\_LO}=f_{IF\_cal}$$

(where $f_{RF\_cal\_USB}=f_{LO}+f_{IF\_cal}$ and $f_{RX\_LO}=f_{LO}$)

while the second one is derived from the LSB of the RF_Cal signal $$f_{LO}-f_{RF\_cal\_LSB}=f_{LO}-(f_{RX\_LO}-f_{IF\_cal})=f_{IF\_cal}$$

Both these two IF components will fall on top of each other when down-converted in the receiver mixers (I and Q mixers) since their frequency is same equal with $f_{IF\_cal}$. The LO component used to generate RF_Cal can have other phases and is not limited to zero degrees phase.

The switch SW1 is ON during calibration and OFF during normal receiving mode, thereby controlling the injection of the calibration signal.

Figure 4:
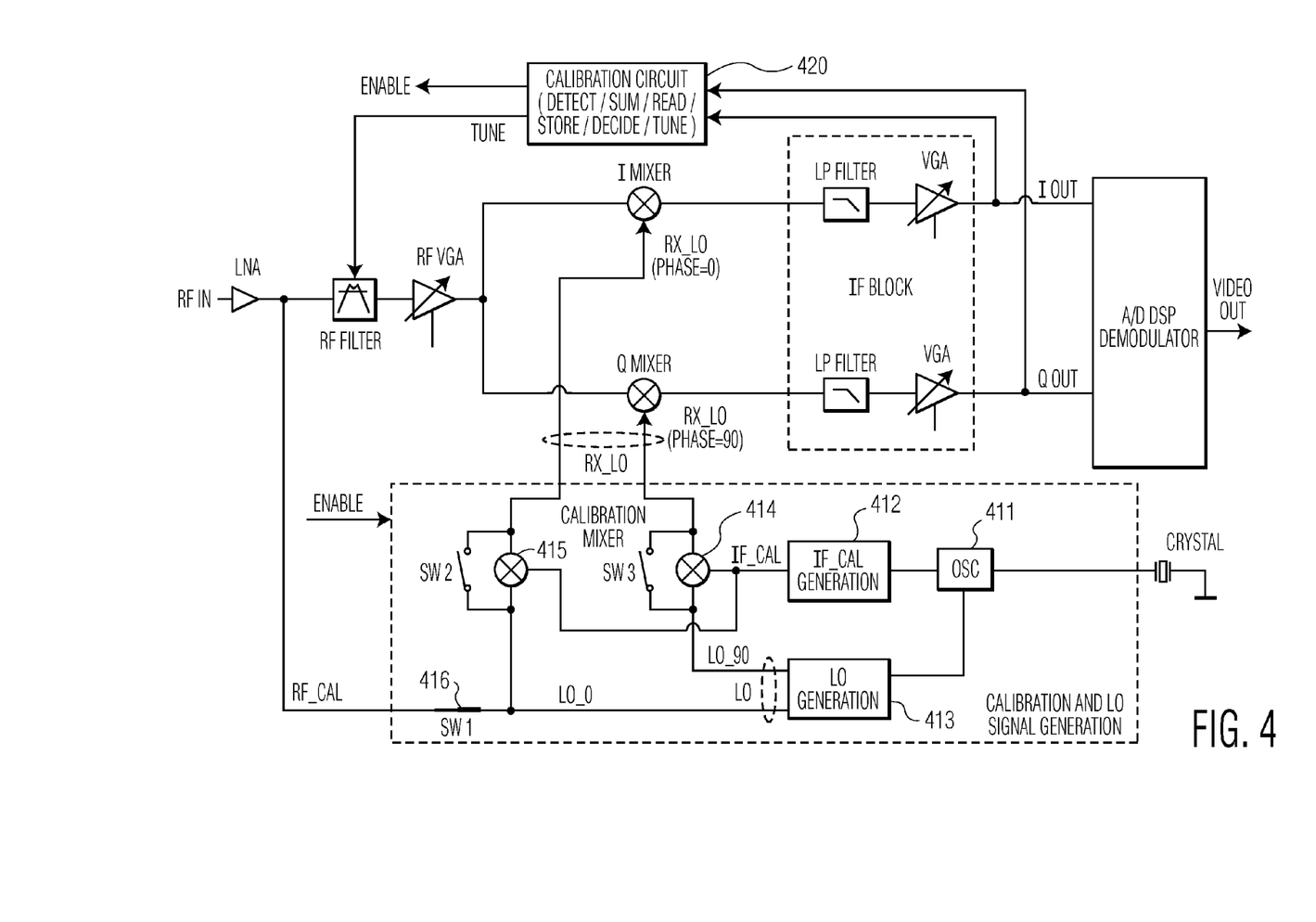
FIG. 4 depicts another example implementation of a receiver/tuner circuit for low IF, according to an example embodiment of the present invention.

FIG. 4 depicts an example implementation of a receiver/tuner circuit implemented according to an example embodiment of the present invention. The RF calibration signal is derived directly from one branch of the local oscillator (LO_0).

During the calibration of the tuner the RX_LO signal is generated by mixing the LO signal with an offset signal IF_cal to produce a Double Side Band signal. The upper side band of the RX_LO has the following frequency $f_{RX\_LO\_USB}=f_{LO}+f_{IF\_cal}$ while the lower side band $f_{RX\_LO\_USB}=f_{LO}-f_{IF\_cal}$. Both sidebands of the local oscillator signal RX_LO will down convert the RF calibration signal at a lower frequency that is equal with $f_{IF\_Cal}$. The $f_{IF\_cal}$ can be choose to be equal or different then IF frequency ($f_{IF}$) of the receiver.

Switch SW1 is ON during calibration and OFF during normal receiving mode to control the injection of the RF calibration signal into the receive path. SW2 and SW3 is OFF during calibration and ON during normal receiving mode, thereby controlling the use of the calibration mixer. The functionality of the various switches can be implemented using a variety of different circuits. For example, SW2 and SW3 do not require separate switches. Instead, the mixer components (e.g., BJT or FET transistors) can be used like a switch to enable and disable the LO branches. For such an implementation, the RX_LO signal is not limited to a DSB signal but SSB can be generated depending of the calibration mixer architecture and IF_cal signal.

Figure 5A:
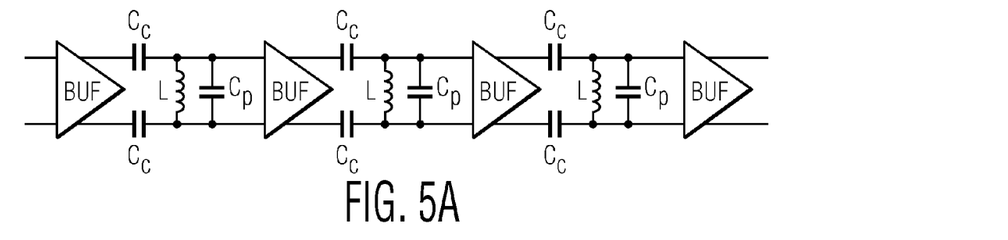
FIG. 5A shows an RF filter architecture that includes multiple cascaded LC parallel circuits, consistent with an embodiment of the present invention.

FIGS. 5A, 5B, 5C and 5D depict aspects of an adjustable filter, consistent with an embodiment of the present invention. FIG. 5A shows an RF filter architecture that includes multiple, cascaded LC parallel circuits. Buffers and capacitive coupling are used to preserve the loaded quality factor of the integrated inductors. In addition, buffers allow a cascaded structure useful for increasing the out-of-band rejection.

Figure 5B:
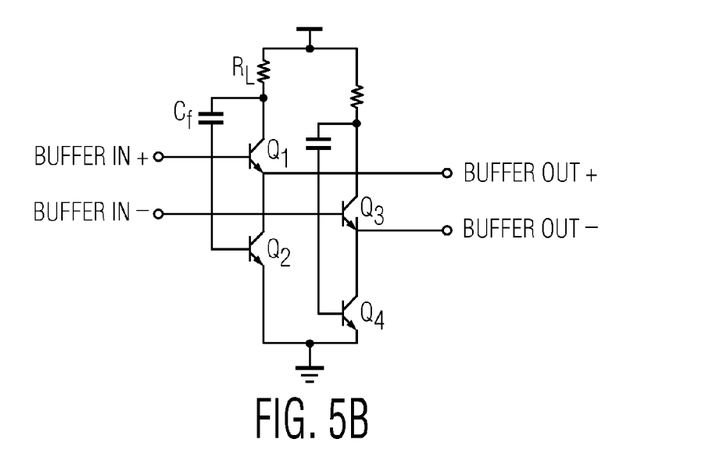
FIG. 5B depicts an example buffer circuit, consistent with an embodiment of the present invention.

FIG. 5B depicts an example buffer circuit. In this embodiment a local feedback loop (Q2, RL, Cf) is introduced to reduce distortion of the emitter follower Q1, which results in nonlinear behavior of the base-emitter voltage of Q1. This loop feeds the AC collector current of Q1 to the base of Q2 via Cf. The larger part of the load current is then supplied by Q1. The resulting base-emitter voltage of Q1 is reduced and therefore the associated distortion of the buffer is reduced. This structure can be particularly useful for providing filter linearity that is high and noise that is low. Although the example has better linearity and immunity to noise performance when used in differential topology a single ended structure can be used. While the voltage gain of the buffer is less than one, the power gain helps compensate the insertion loss due to components limited quality factor. Implementations of the buffer other than the specific implementation depicted can also be used where the output resistance of the buffer is very low (a few ohms) and the input impedance is high (several thousand ohms).

Figure 5C:
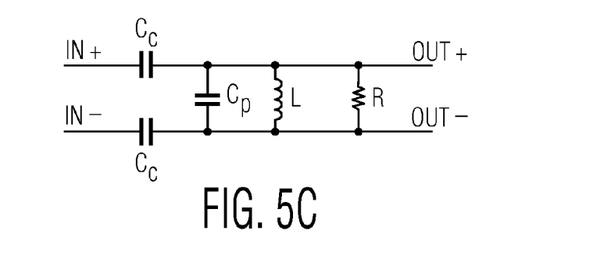
FIG. 5C depicts an example filter circuit, consistent with an embodiment of the present invention.

FIG. 5C depicts an example portion of a filter circuit. The filter is tuned to desired channel frequency when the LC circuit (L, Cp and Cc) is at resonance. The frequency of resonance is given by the following formula:

$$Fo=1/(2*\tau*SQRT(L*(Cc/2+Cp)))$$

Where Cc is the coupling capacitor and Cp is the parallel capacitor.

The filter transfer function depends on the frequency of operation, equivalent parallel resistance and the coupling capacitor value:

$$H(\omega)=\omega R Cc/2$$

(where R is the equivalent circuit parallel resistance at resonance)

Cc, Cp and L determine the gain/loss of the filter, filter bandwidth and rejection of the out of band undesired signals. These values are chosen for each channel. Since inductor variation can often be considered negligible (<2%), the calibration method involves determining the right values for the Cc and Cp. To allow for adjustability each capacitor (Cc and Cp) can be implemented using an adjustable array of capacitors connected in parallel as shown in FIG. 5D.

Figure 5D:
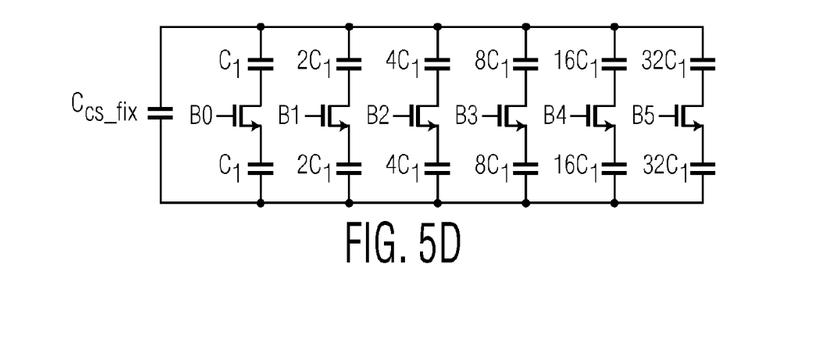
FIG. 5D shows an adjustable array of capacitors, consistent with an embodiment of the present invention.

FIG. 5D shows an adjustable array of capacitors. Each capacitor of the array is switched in and out of the circuit by using PET switches. By controlling the state of the switches the array can provide a range of discrete capacitance values. The resolution between two discrete values is dictated by the minimum capacitor value from array (C1 in FIG. 5D). For instance, the minimum capacitor value is $C_1$, resulting in the discrete values being separated by $C_1/2$ (due to the parallel arrangement of two C1 capacitors). In this example the array of capacitors is arranged in binary ratios (1-2-4-8-16-32) to allow adjustment of capacitance from 1 to a total of 63 units. Other capacitor ratios can be used, binary or otherwise. In this implementation, a unit is represented by one half of the minimum capacitor value and corresponds to a low significant bit (LSB). The unit value has a direct impact over the tuning accuracy. The array can be associated with a register that stores a numerical value that dictates the configuration of the switches and ultimately provides the required capacitance. These numerical values can be derived from design or calibration and stored in the system memory/registers as an equivalent binary number. In general due to process, temperature and voltage variations the total real capacitance value of the array is often different than the programmed numerical value.

The values of the capacitor array are chosen accordingly to allow covering the band of interest (in an example case of L-Band: 950-2,150 MHz) and help fine tune the receiver in the middle of the channel of interest.

In a specific implementation, the adjustable RF filter has three stages connected sequentially; however, the number of stages can vary depending upon the application. Each stage has a buffer and a tunable filter. The calibration signal is derived from the local oscillator and is typically applied at the input of the RF filter. Since the receiver employs several gain stages with automatic gain control (AGC) the input signal level is not critical as long as the expected range of output level is reached.

The tuning is done by switching in and out multiple capacitors from the capacitor array. The switches that connect the capacitors in the circuit can be controlled by the calibration circuit. The calibration circuit can be configured and arranged to execute an algorithm that is implemented as a sequence of logic loops. This can be accomplished using, for example, discrete logic, programmable logic arrays, registers or processors executing instructions stored in a memory and combinations thereof. Based on the algorithm certain capacitors are connected into the filter and the value of the output voltage at the receiver output is recorded.

After a series of iterations the array of the capacitors that provides the optimum tuning and frequency response will be the one selected to tune the filter during normal operation. A variety of methods can be used to arrive at optimum tuning capacitance.

The RF filter tuning and calibration is based on injecting a RF signal at the RF filter input. The output signal after down-conversion and amplification by the tuner is then evaluated. It has been shown above that in order to tune to desired channel and to achieve a specific signal amplitude at the RF filter output the values for Cc and Cp are unique. This assumes that inductor L has a fixed value by design and that variation of the inductor (e.g., process, voltage or temperature (PVT) variation) is negligible.

While ideal capacitor values are determined by design and/or component selection, variations from the ideal values often occur. These variations generally cannot be predicted and can be caused by multiple factors, such as process variations, temperature, voltage and parasitic effects. Multiple measurements during the calibration allow the calculation of the initial capacitance error. This is possible since measurements are done at frequencies that are known and accurately generated from a stable crystal reference.

Figure 6:
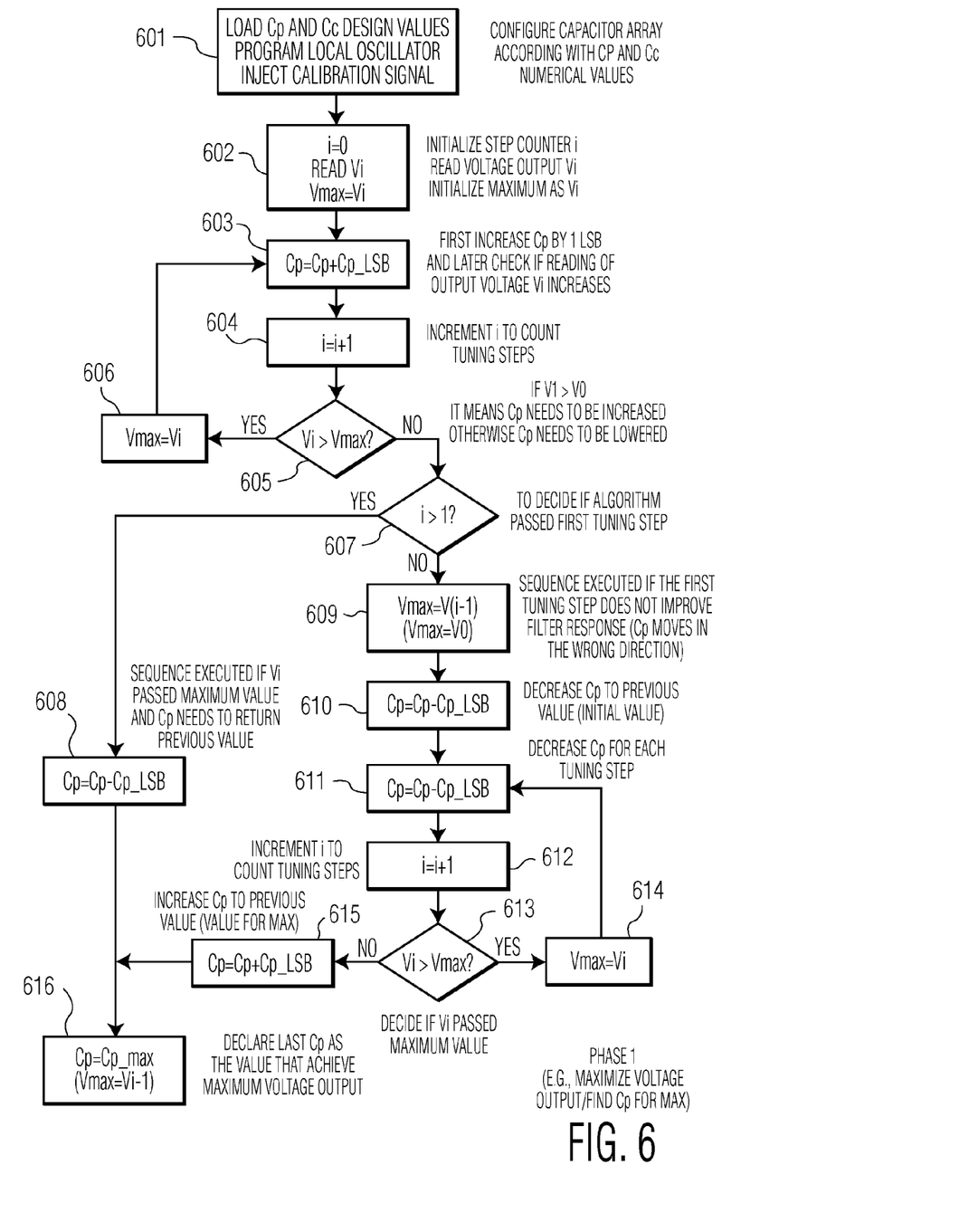
FIG. 6 depicts a method for a relatively coarse calibration of the circuit, consistent with an embodiment of the present invention.
Figure 7:
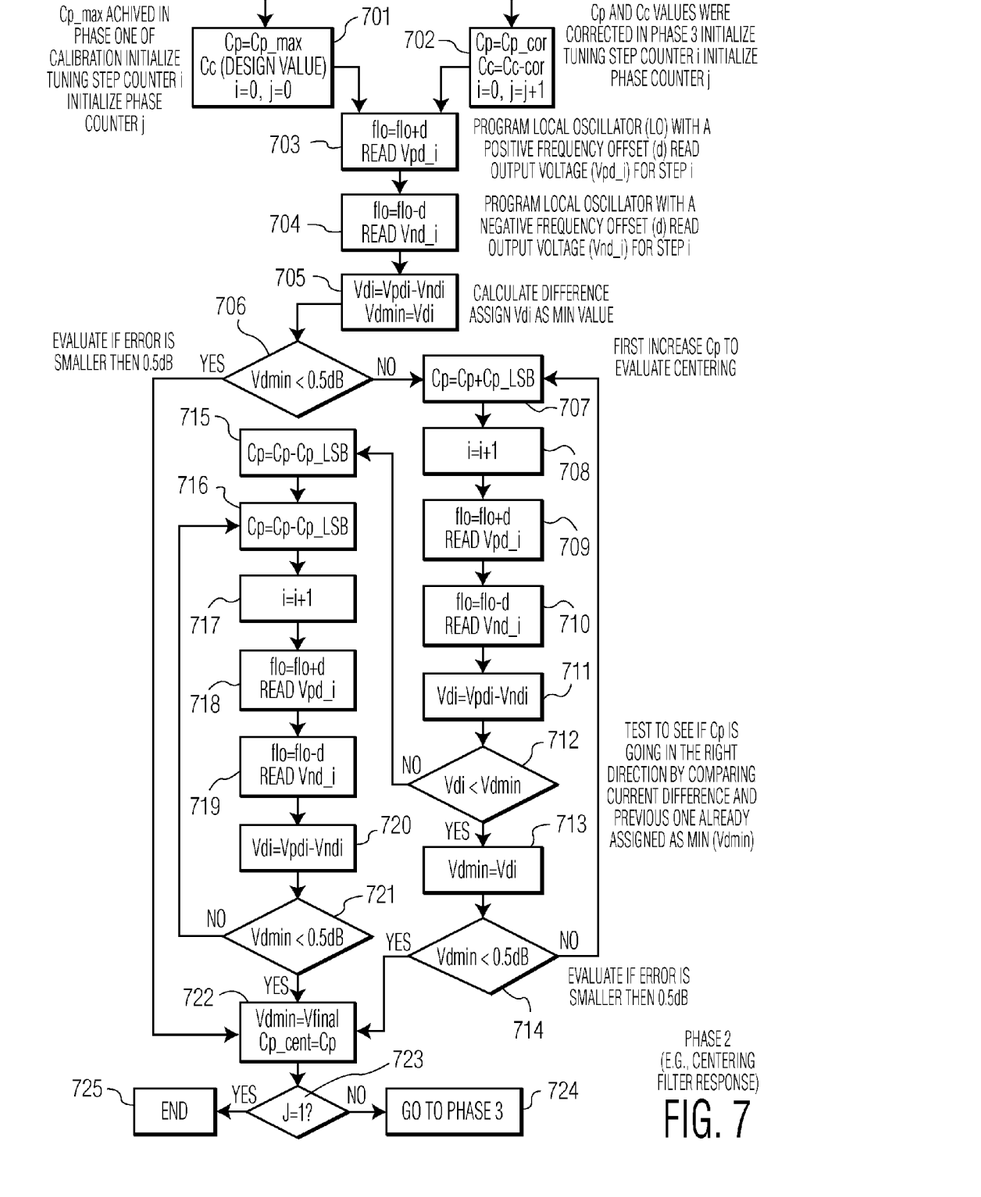
FIG. 7 depicts a method for further calibrating a tuner/receiver circuit, consistent with an embodiment of the present invention.
Figure 8:
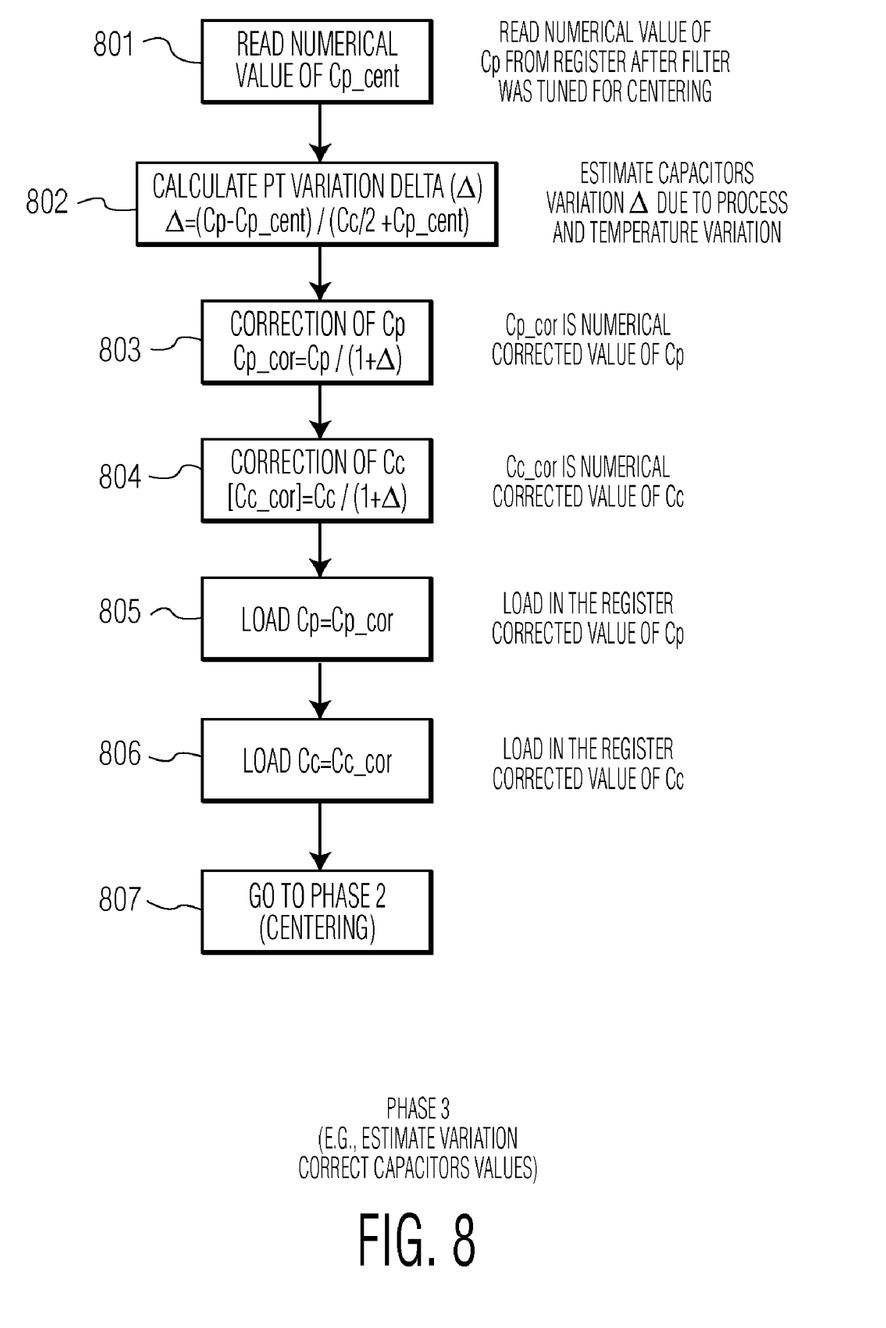
FIG. 8 depicts a method for determining component (e.g., capacitor) deviation from ideal values, consistent with an embodiment of the present invention.

FIG. 6, FIG. 7 and FIG. 8 depict flow charts for methods of tuning and calibration of the filter, according to an embodiment of the present invention. The specific algorithm is merely an example of one embodiment of the present invention and there are a variety of variations and other methods that could be implemented.

Together, FIGS. 6, 7 and 8 depict three phases of calibration. The first phase involves an initial tuning performed in the middle of the channel. The calibration signal frequency is fixed, programmed in the center of the channel and Cp values are modified simultaneously for all LC cells. The resulting responses are used to select a Cp value.

In one implementation the Cp values are selected by finding the Cp value that maximizes signal level at the tuner output. Since the transfer function of the filter increases with frequency this criteria does not guarantee that filter response is centered symmetrically on the middle of the desired channel. To reduce possible tuning errors additional steps can be used.

The second phase involves tuning the calibration signal using offsets from the center of the channel. A positive offset frequency, followed by a negative offset frequency, is applied relative to the middle of the channel. This offset can be achieved by programming the LO for the appropriate frequency.

The receiver output voltage is amplified, measured and stored for both measurements and the difference is evaluated. The process can be used to determine a setting for the parallel capacitors that minimizes this difference, or that is within an acceptable error (e.g., with 0.5 dB). At the end of this procedure the filter is substantially centered but the values of Cc and Cp may not be the ones assigned by design (e.g., due to PVT and layout variations).

In the third phase, the results of the second phase can be used to calculate the capacitor error. For example, a following formula can be used in the calculation to determine correction for the capacitor error.

At resonance Cc/2+Cp=Cres where Cres is the total capacitor value that tunes the circuit at a frequency equal with channel center. The above values for Cc and Cp are the optimum values that can be determined by design. These values can be stored in internal registers or other memory of the receiver and used in connection with corrected/actual capacitor values.

The calibration circuit can use the optimal values to configure the capacitor arrays to achieve the Cp and Cc desired capacitance. If, however actual capacitor values are affected by the process variations, the actual capacitance will inevitably differ from the desired values. For the coupling capacitor, the real circuit value will be Cc_real=Cc+Cc*Δ=Cc*(1+Δ) where Δ is the capacitance relative variation due to process and voltage (for example Δ=0.05=5%). If it is assumed that variation due to process or temperature is the same for Cp then the real value for parallel capacitor Cp becomes Cp real=Cp*(1+Δ).

This leads to the following identity:

$$Cc/2*(1+\Delta)+Cp*(1+\Delta)=Cres*(1+\Delta).$$

If the Cp is tuned to center the filter then the sum of the real circuit capacitors values is equal with resonance capacitor. That is:

$$Cc\_real/2+Cp\_cent\_real=Cres;$$

where Cp_cent_real is the real capacitor array value that centers the filter. Based on real values and the variation Δ, the above expression becomes:

$$Cc/2*(1+\Delta)+Cp\_cent*(1+\Delta)=Cres;$$

where Cp_cent is the numerical value that achieves tuning of the filter in the center of the desired channel. This numerical value is provided (e.g., read from the registers) after phase two of calibration. Cp_cent translates to a real value that is affected by same Δ: Cp_cent_real=Cp_cent*(1+Δ).

From the above identities Δ can be easily calculated:

$$\Delta=(Cp-Cp\_cent)/(Cc/2+Cp\_cent).$$

If Δ is known, then values of the numerical values Cp and Cc can be corrected accordingly so the actual real values match the design values. The corrected numerical values for Cc and Cp are:

$$Cc\_corr=Cc/(1+\Delta) \text{ and } Cp\_corr=Cp/(1+\Delta).$$

These corrected numerical values can be loaded in the tuner memory/registers and used during next phase of calibration or normal receiving mode.

The second phase can be repeated as desired (e.g., to increase the precision of the filter centering).

FIG. 6 depicts a method for a relatively coarse calibration of the circuit, consistent with an embodiment of the present invention. At step 601, the calibration circuit loads (e.g., from memory) Cc and Cp values accordingly with the channel/frequency that needs to be received. The values can be determined using ideal/design Cc and Cp values. These values are affected by the process variations and are used, initially, to tune the RF filter close to the desired channel frequency. The local oscillator is programmed according to the desired channel. The calibration signal, having a frequency equal (or sufficiently near) to the center of the channel, is then injected at the filter input. Variations from the center of the channel are possible. For instance, the variation might be small enough to not affect the results in a significant manner.

At step 602, the calibration circuit reads the low IF (or DC) voltage of the down-converted calibration signal. The value is stored along with the current settings for the RF adjustable filter. A variable (i) can be used to count tuning steps and is initialized.

At step 603, the calibration circuit increases Cp by one least-significant bit (LSB) value.

At step 604 the counter value is increased by one to account for a change in tuning.

At step 605 the calibration circuit determines whether the signal was improved with the new (Cp) filter settings. For example, the calibration circuit can determine whether low IF (or DC) signal voltage increased or decreased in value. If an increase was detected, the signal voltage value can be recorded as a reference for a new maxim and stored as shown by step 606.

Generally speaking, the calibration circuit decides, in the beginning of the algorithm, whether Cp needs to be increased or decreased to produce a corresponding increase in the output voltage. This can be accomplished in a number of manners. For example, an exhaustive calibration over every possible setting could be conducted. This, however, is often unduly burdensome.

If the calibration circuit determines that an increase in Cp value did not result in an increase in the signal voltage, a second loop starting at step 607 is implemented. At step 607 the calibration circuit uses the tuning step counter to determine whether or not the algorithm passed the first tuning step.

If the counter indicates that multiple steps were executed, the loop formed by 603, 604, 605 and 606 was followed multiple times. This loop is executed as long as increasing Cp improves tuning and is abandoned when maximum output voltage is passed. Therefore, if the step 607 condition is fulfilled, the algorithm decreases the last Cp value by one LSB (step 608) and uses this value as the optimum value at step 616.

If at step 607 decision is made that only the first tuning step was executed, it implies that first step failed to improve tuning. This would indicate that an incremental decrease in the Cp setting might improve the signal voltage, and the process can continue to step 609.

At step 609, the initial value is set as the current maximum signal voltage. At steps 610 and 611 the Cp setting is decreased by one unit (e.g., the Cp_LSB value).

At step 610 the CP setting is decreased by one unit equal with the Cp_LSB value to return the CP value to the initial value of step 601. Step 611 begins a new loop that optimizes the tuning by decreasing Cp for each iteration.

At step 612, the tuning step counter is increased. At step 613, the calibration circuit determines whether or not the signal voltage increased as a result of the decrease in the Cp setting. If so, then the current signal voltage is stored as the maximum signal voltage at step 614. If not, the loop consisting of steps 611, 612, 613 and 614 is exited and the previous CP setting is assumed to provide the desired (maximum) signal voltage, as shown by step 615.

Once the Cp setting is determined, the first phase ends at step 616.

Conceptually, the operation of the process of FIG. 6 can be thought of as a method for increasing or decreasing the Cp value until a (local) maximum is reached. The value of Cp that achieved the maximum voltage is then retained. Of course, variations on how to adjust the Cp values during calibration are also possible.

FIG. 7 depicts a method for further calibrating a tuner/receiver circuit. This method can be implemented alone or in combination with other calibration techniques, such as the techniques discussed in connection with FIG. 6. At steps 701 and 702, the Cp and Cc values are initialized. In addition to a tuning counter i, a calibration phase counter j is initialized.

Step 701 shows an initialization value resulting from a method of FIG. 6, whereas step 702 shows an initialization value resulting from a method of FIG. 8. Other sources for initialization values are also possible including, but not limited to, values derived from ideal filter characteristics.

At steps 703 and 704, an offset frequency (d) is added and subtracted from the RF calibration signal. This can be accomplished by programming the local oscillator frequency with the same offset (LO+/−d). The resulting signal strength for each frequency offset is then recorded.

At step 705, the calibration circuit computes a difference between the signal strength from each frequency offset. At step 706, the calibration circuit takes the computed difference and determines whether or not the difference is below an acceptable error value (e.g., 0.5 dB). If so, the centering of the filter selectivity curve is considered done and the process proceeds to step 722. If not, then, in step 707, the calibration circuit increases Cp by one Cp_LSB. The tuning step counter is incremented at step 708.

After adjusting the Cp value, the offset frequency is added and subtracted from the local oscillator frequency (LO+/−d) in steps 709 and 710. The resulting signal strength for each frequency offset is recorded.

The calibration circuit determines, in steps 711 and 712, whether or not the adjustment in Cp value resulted in an improvement in the difference between offset signal strengths. If not, the process proceeds through steps 715-721 to incrementally decrease the Cp value until the difference between offset signal strengths is sufficiently small (as determined in step 721). If so, the process proceeds through steps 713-714 and 707-713 to incrementally increase the Cp value until the difference between offset signal strengths is sufficiently small (as determined in step 714). Once an acceptable difference has been obtained, or further improvement is not possible, the process continues to step 723. The counter j being equal to zero indicates that phase two was executed for the first time and calibration should continue with phase three. The counter j equaling one indicates that centering was already done and with corrected values for Cc and Cp; therefore, the calibration can end.

FIG. 8 depicts a method for determining component (e.g., capacitor) deviation from ideal values, consistent with an embodiment of the present invention. This deviation can be calculated as a function of the currently determined (e.g., from methods of FIG. 6 and FIG. 7) Cp value (Cp_cent) and an ideal value stored in system registers/memory. This value can be represented as a correction percentage that is applied to Cc and Cp. An example formula for such error calculation is discussed above in connection with the third phase of calibration. A particular method for implementing such a formula and resulting correction is shown by steps 801-807. The calibration circuit uses the value of Cp determined by previous calibration (step 801). In step 802, the calibration circuit determines capacitor variation as a percentage value. These variations can be due to factors, such as process and temperature. In steps 803 and 804, the calibration circuit adjusts the values of Cp and Cc accordingly. These adjusted values can be stored in tuner registers/memory during steps 805 and 806. These stored values can then be used in calculating future filter settings (e.g., determining the frequency response at a different channel or of an associated filter) either for phase two of calibration or normal receiving mode.

The various embodiments described above and shown in the figures are provided by way of illustration only and should not be construed to limit the invention. Based on the above discussion and illustrations, it will be recognized that the circuits described herein may be manufactured using standard processes and techniques. Those skilled in the art will readily recognize that various modifications and changes may be made to the present invention without strictly following the exemplary embodiments and applications illustrated and described herein. Such modifications and changes do not depart from the true scope of the present invention.

What is claimed is:

1. A radio-frequency (RF) receiver circuit comprising:
   an adjustable RF filter circuit in a receive path of the RF receiver circuit;
   a local oscillator (LO) configured for generating a LO signal and a receiver local-oscillator (RX_LO) signal from the LO signal;
   a mixing circuit configured for mixing a signal received from the adjustable RF filter circuit and the RX_LO signal;
   an intermediate frequency (IF) block filter in the receive path and having a pass-band;
   a calibration signal (IF_cal) circuit configured for generating an IF_cal signal at the receiver circuit, the IF_cal signal having a frequency within the pass-band of the IF block filter;
   a calibration circuit configured for implementing a calibration mode and a receive mode,
      in response to the calibration mode, the calibration circuit configured for
         generating a double side band calibration signal from mixing the LO signal and the IF_cal signal;
         injecting the calibration signal into the receive path of the RF receiver circuit and before the adjustable RF filter; and
         responsive to the injected calibration signal and an output of the mixing circuit, generating a feedback signal for controlling a setting of the adjustable RF filter circuit; and
      in response to the receive mode, the calibration circuit configured for
         disabling the injection of the calibration signal into the receive path of the RF receiver circuit.

2. The circuit of claim 1, wherein the adjustable RF filter circuit includes
   a high-impedance input buffer configured to be responsive to an input signal; and
   a set of inductor-capacitor (LC) circuits, each separated by a respective high-impedance input and low impedance output buffer, each LC circuit of the set of LC circuits having an inductor; and a parallel capacitor array, connected in parallel with the inductor, that includes a first set of capacitor elements that are selectively disabled in response to the feedback signal; and a coupling capacitor array, connected in series between the respective buffer and the inductor and the parallel capacitor array, that includes a second set of capacitor elements that are configured to be selectively disabled in response to the feedback signal; and a high-impedance output buffer configured to be responsive to an output from a last LC circuit of the set of LC circuits.

3. The circuit of claim 1, wherein the IF_cal circuit is configured for generating the IF_cal signal at a frequency equal to a frequency of an intermediate frequency signal used in the receive mode.

4. The circuit of claim 1, wherein the calibration circuit is further configured to generate a feedback signal by generating I and Q signal components by mixing a signal output from the adjustable RF filter circuit with an RX_LO signal and a derivation of the RX_LO signal that is shifted 90 degrees;

adding the squared versions of each of the I and Q signal components to produce an assessment of the adjustable RF filter circuit; and generating the feedback signal in response to the assessment.

5. The circuit of claim 1, wherein the calibration circuit is further configured for implementing multiple calibration modes, wherein the calibration signal of each mode uses a respective and different offset value.

6. The circuit of claim 5, wherein, for a first calibration mode, the frequency of the calibration signal is about equal to a center channel frequency, for a second calibration mode, the calibration signal is at a positive frequency offset from the center channel frequency, for a third calibration mode, the calibration signal is at a negative frequency offset from the center channel frequency, and wherein, from each mode, respective, determined values for the adjustable RF filter circuit are used to generate a setting for the RF filter circuit.

7. The circuit of claim 1, further including an adjustable coupling capacitor array and an adjustable parallel capacitor array, the adjustable parallel capacitor array in parallel with an inductive filter element.

8. The circuit of claim 1, wherein the circuit further includes a single integrated circuit die upon which at least the adjustable RF filter circuit and the LO are located.

9. The circuit of claim 1, wherein the adjustable RF filter circuit is further configured for use with high linearity and low noise integrated broadband tuner applications.

10. The circuit of claim 1, wherein the adjustable RF filter circuit includes a capacitive array having a plurality of capacitive elements and wherein a capacitive value of each capacitive element of the plurality of capacitive elements is adjustable in response to the feedback signal.

11. A radio-frequency (RF) circuit implemented method that uses an intermediate frequency signal during receiving of RF signals, the method comprising:

generating a local oscillator (LO) signal;

generating a receiver local-oscillator (RX_LO) signal from the LO signal;

down-converting a received RF signal;

filtering the down-converted RF signal using an IF block filter;

injecting, into a receive path of the RF circuit, an double side band injection signal derived from a local oscillator (LO) signal and a calibration (IF_cal) signal that has a frequency that is within a band pass of the IF block filter;

filtering the injected signal, using an adjustable RF filter circuit, to produce a filtered signal;

mixing the filtered signal with the RX_LO signal to produce an IF signal; and selecting a filter setting for the adjustable RF filter circuit, the selection responsive to the IF signal.

12. The method of claim 11, wherein the step of selecting an RF filter setting includes selecting a coupling capacitor setting and a parallel capacitor setting, the parallel capacitor setting used to adjust capacitance in parallel with an inductive filter element.

13. The method of claim 11, further including the steps of iteratively adjusting filter settings of the adjustable RF filter circuit; and determining the signal strength of IF signals for each of the filter settings; and wherein the step of selecting a filter setting for the adjustable RF filter circuit is responsive to the determined signal strength.

14. The method of claim 11, further including the steps of, adjusting the frequency of the injection signal; and selecting, for each of the adjusted frequencies of the injection signal, a filter setting for the adjustable RF filter circuit.

15. The method of claim 11, further including a coarse tuning mode that includes the steps of iteratively adjusting capacitive-filter settings of the adjustable RF filter circuit;

assessing the effectiveness of the capacitive-filter settings; and selecting a coarse capacitive-filter setting in response to the step of assessing a fine tuning mode that includes the steps of applying a negative frequency offset to the injection signal;

assessing the effectiveness of coarse capacitive-filter setting for the negatively offset injection signal;

applying a positive frequency offset to the injection signal;

assessing the effectiveness of coarse capacitive-filter setting for the positively offset injection signal; and selecting a fine capacitive-filter setting as a function of the assessments for the negatively offset and positively offset injection signals; and an error correction mode that includes the steps of calculating actual capacitive deviation of the adjustable filter circuit using a comparison of the selected fine capacitive-filter setting to expected values; and setting the capacitive-filter settings of the adjustable filter circuit as a function of the calculated actual capacitive deviation.

16. A radio-frequency (RF) receiver circuit comprising:

an adjustable RF filter circuit in a receive path of the RF receiver circuit;

a local oscillator (LO) configured for generating a LO signal;

an intermediate frequency (IF) block filter in the receive path and having a pass-band;

an calibration signal (IF_cal) circuit configured for generating an IF_cal signal at the receiver circuit, the IF_cal signal having a frequency within the pass-band of the IF-block filter;

a first mixing circuit that when enabled generates an receiver local oscillator (RX_LO) signal by mixing the LO signal with the IF_cal signal and when disabled generates the RX_LO signal from the LO signal;
a second mixing circuit configured for mixing a signal received from the adjustable RF filter circuit and the RX_LO signal;
a calibration circuit configured for implementing a calibration mode and a receive mode,
in response to the calibration mode, the calibration circuit configured for
enabling the first mixing circuit;
generating calibration signal from the LO signal;
injecting the calibration signal into the receive path of the RF receiver circuit and before the adjustable RF filter; and
responsive to the injected calibration signal and an output of the mixing circuit, generating a feedback signal for controlling a setting of the adjustable RF filter circuit; and
in response to the receive mode, the calibration circuit configured for
disabling the injection of the calibration signal into the receive path of the RF receiver circuit; and
disabling the first mixing circuit.

17. The circuit of claim 16, wherein the calibration circuit is further configured for
adjusting frequencies of the injection signal and
selecting, for each of the adjusted frequencies of the injection signal, a filter setting for the adjustable RF filter circuit.

18. The circuit of claim 16, wherein the adjustable RF filter circuit includes
a high-impedance input buffer configured to be responsive to an input signal; and
a set of LC circuits, each separated by a respective high-impedance input and low impedance output buffer, each LC circuit of the set of LC circuits having
an inductor; and
a parallel capacitor array, connected in parallel with the inductor, that includes a first set of capacitor elements that are selectively disabled in response to the feedback signal; and
a coupling capacitor array, connected in series between a respective buffer and the inductor and parallel capacitor array, that includes a second set of capacitor elements that are selectively disabled in response to the feedback signal; and
a high-impedance output buffer configured to be responsive to an output from a last LC circuit of the set of LC circuits.

19. The circuit of claim 16, wherein the calibration circuit is further configured to generate a feedback signal by
generating I and Q signal components by mixing a signal output from the adjustable RF filter circuit with an RX_LO signal and a derivation of the RX_LO signal that is shifted 90 degrees;
adding the squared versions of each of the I and Q signal components to produce an assessment of the adjustable RF filter circuit; and
generating the feedback signal in response to the assessment.

20. The circuit of claim 16, wherein calibration circuit is further configured for implementing multiple calibration modes, wherein the calibration signal of each mode uses a respective and different offset value.

* * * * *